Figure 1:
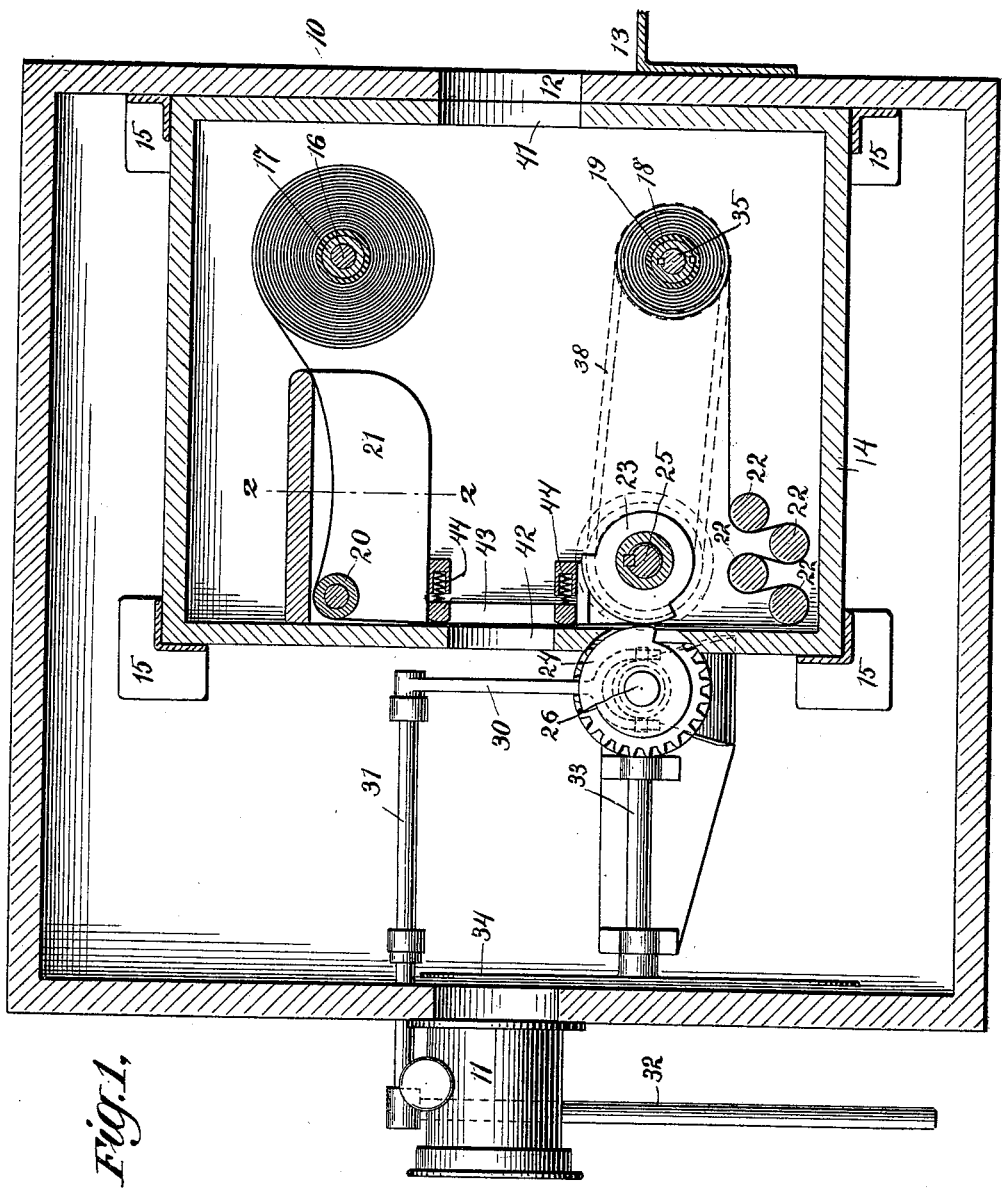

No. 636,715. Patented Nov. 7, 1899.
H. CASLER.
CONSECUTIVE VIEW APPARATUS.
(Application filed Mar. 1, 1899.)
(No Model.) 2 Sheets—Sheet 1.

WITNESSES:

INVENTOR
Herman Casler
BY
ATTORNEYS

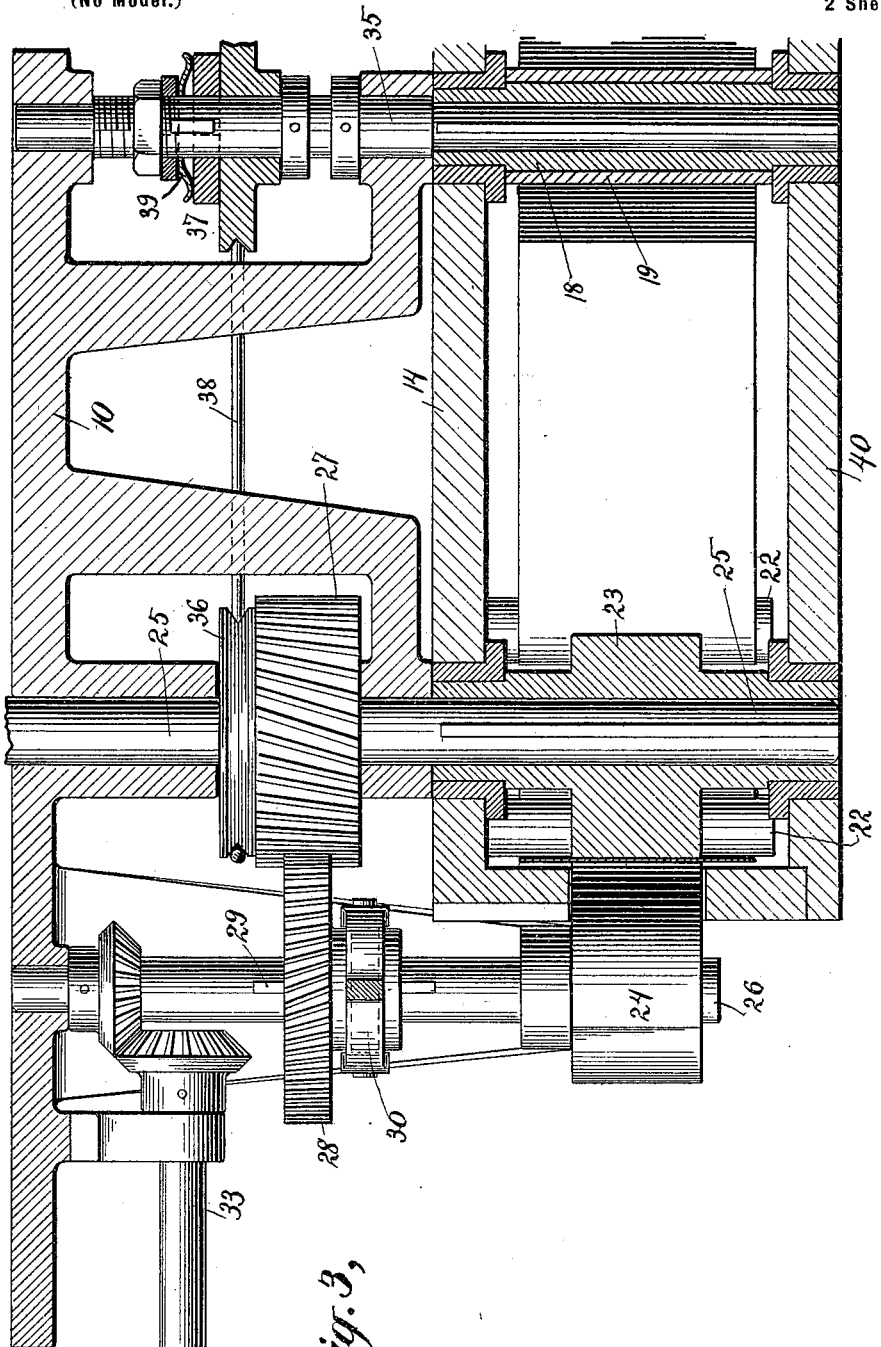

United States Patent Office.

HERMAN CASLER, OF CANASTOTA, NEW YORK, ASSIGNOR TO THE AMERICAN MUTOSCOPE COMPANY, OF NEW JERSEY.

CONSECUTIVE-VIEW APPARATUS.

SPECIFICATION forming part of Letters Patent No. 636,715, dated November 7, 1899.

Application filed March 1, 1899. Serial No. 707,296. (No model.)

*To all whom it may concern:*

Be it known that I, HERMAN CASLER, a citizen of the United States, residing at Canastota, in the county of Madison and State of New York, have invented certain new and useful Improvements in Consecutive-View Apparatus; and I do hereby declare the following to be a full, clear, and exact description of the invention, such as will enable others skilled in the art to which it appertains to make and use the same.

My invention relates generally to improvements in consecutive-view apparatus, and particularly to improvements in consecutive-view cameras and projecting apparatus.

My invention consists in the use, in consecutive-view apparatus, of a removable case containing supply and winding-up reels and suitable guides and feeding devices for the film or picture-strip adapted when placed in the apparatus to be connected with suitable driving mechanism, in the novel means employed for receiving the strain upon the film produced by the frictional driving device which drives the winding-up reel, in the novel means employed for preventing undue strain upon the film through the intermittent action of the feeding mechanism, and generally in the novel combination, construction, and arrangement of the parts.

The objects of my invention are to facilitate the removal of films or picture-strips from consecutive-view apparatus and the substitution of other films or picture-strips, to avoid injury to the film from the strain imposed thereon by the intermittent operation of the feeding mechanism, to prevent the transmission of the strain produced by the winding-up reel to that portion of the film lying within the field of exposure, and to make the apparatus simple, compact, durable, and comparatively inexpensive. These objects are attained in the invention herein described, and illustrated in the drawings which accompany and form a part of this specification, in which the same reference-numerals indicate the same or corresponding parts, and in which—

Figure 2:
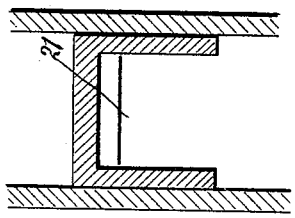

Figure 1 is a vertical longitudinal section of the apparatus, taken through the optical axis. Fig. 2 is a cross-section of the trough through which the film or picture-strip passes, taken on the line 2 2 of Fig. 1; and Fig. 3 is a detail horizontal section of the film-feeding mechanism.

In the drawings, 10 is the outer case of a consecutive-view projecting apparatus; 11, the objective-lens thereof; 12, a light-opening in rear of the case concentric with the optical axis, and 13 a shelf (the greater portion of which has been broken away) upon which a suitable projecting-lantern may be placed.

14 is a film box or case located within the case 10 and supported by suitable guides 15 15, so constructed that said case 14 may be removed through the side of the case 10 by simply sliding it out from its guides or supports. The film-case is provided with a stud 16 for carrying a supply-reel 17 and a hollow shaft or bushing 18, mounted in bearings in the sides of the film-case, for carrying a winding-up reel 19.

20 is a guide-pulley over which the film or picture-strip may pass. It is mounted within a trough 21, located in the path of the film, the internal width of which is only very slightly greater than that of the film or picture-strip.

22 22 are a series of studs arranged in zigzag fashion and over which the film or picture-strip may pass on its way to the winding-up reel. The purpose of these studs is to prevent the strain upon the film produced by the tendency of the winding-up reel to revolve from being transmitted to that portion of the film which is in the optical field. The studs are in effect and may be termed "snubbing-posts."

23 and 24 are two segmental feed-rollers for feeding the film forward intermittently, one of which, 24, projects through an opening in the front of the case 14. The major portion of the face of each of these rollers is cut away, as shown, leaving a working surface extending through only a portion of the circumference of each roller. Roller 23 is mounted in bearings in the sides of the case 14 and is provided with a keyway adapted to engage a key upon a driving-shaft 25 when the case 14 is in place in the apparatus. The shaft 25 projects through the side of the case 10, as indicated in Fig. 3. To the outer end of the shaft may be secured a device, such as a pulley-wheel, for transmitting power to said shaft from a suitable source of power. Roller 24 is mounted upon and keyed to a shaft 26, parallel to shaft 25 and having bearings in the framework of the case 10. Shaft 26 is driven from the shaft 25 by means of two screw-gears 27 and 28. Gear 27 is fast upon shaft 25; but gear 28 is laterally movable upon shaft 26, transmitting motion to said shaft by means of a key 29. It has a grooved hub engaged by a yoke 30, mounted upon a rock-shaft 31, which projects through the front of the case 10 and is provided with an operating-handle 32.

A shutter-shaft 33, carrying a shutter 34, is mounted in bearings in the frame of the case 10 and is driven by bevel-gears from the shaft 26.

When the film-case 14 is placed within the case 10, a shaft 35 passes through the bushing 18, upon which the winding-up spool 19 is mounted, and engages said bushing by means of a suitable key. This shaft is driven from shaft 25 by means of pulleys 36 and 37, a belt 38, and an adjustable frictional device 39, which permits pulley 37 to slip upon the shaft 25 when all slack in the film has been taken up.

One side 40 of the case 14 is removable; but the bearings of the roller 23 and bushing 18 in the other side of said case are sufficient to support them when the side 40 of the case is removed.

In the ends of the case 14 are two light-openings 41 and 42, concentric with the optical axis of the apparatus when the case 14 is placed therein. The opening 42 is surrounded by a presser-frame 43, pressed toward the front of the case by springs 44, as shown in Fig. 2.

The operation of the apparatus is as follows: In practice each camera or projecting apparatus will be provided with a number of removable film or picture-strip boxes 14, which will be prepared for use before they are placed in the camera or projecting apparatus. Each of these boxes is prepared for use by placing a reel of unexposed film or reel of picture-strip upon the stud 16 and carrying the end of said strip through the trough 21, over the roller 20, between the presser-plate 43 and the front of the case 14, in front of the roller 23, around the zigzag studs 22, and securing the end of the film to an empty winding-up reel 19, mounted upon the bushing 18. The film-box is then closed. When it is desired to expose the film in said box or to exhibit the pictures upon the picture-strip therein, said box is placed in the camera or exhibiting apparatus, as the case may be, the roller 23 fitting over the shaft 25, and the bushing 18, carrying the winding-up reel 19, fitting over the shaft 35. The shape of the roll 24 is such that when the portion of said roll which is of less diameter than the working portion thereof is toward the front of the box 14 said box may be put in place, and then when the shaft 25 is rotated the working portion of said roll 24 passes through the opening in the face of the box. The rotation of the driving-shaft 25 may then be commenced. The rollers 23 and 24 in revolving draw the strip from the reel 17 intermittently and feed the same downward, and as this strip is fed downward it is wound up by the winding-up reel 19, which slips whenever the strip is drawn taut. The studs or snubbing-posts 22 prevent the transmission of the strain on the film so produced to that portion of the film which is in the optical field.

Since the strip is drawn from the reel 17 by rollers 23 and 24 intermittently, excessive strain might be placed upon the film by the sudden jerking forward of successive portions thereof were it not for the cushioning action of the air imprisoned between that portion of the strip lying within the trough 21 and the top of said trough. The trough with the film together form, in effect, an air-cushion. When the film is drawn taut by the rollers 23 and 24, the air between the film and the top of the trough 21 passes out around the sides of the film, but in so doing affords a certain amount of resistance to the taking up of the slack, which prevents excessive strain upon the film when said slack has been taken up.

In consecutive-view projecting apparatus in which the film is fed forward frictionally, as is the case in this apparatus, it is desirable to provide means for varying the length of film fed forward at each operation of the intermittently-acting projecting apparatus to compensate for slipping of the film or change in its length due to atmospheric conditions, unequal shrinkage during development, or other causes. The screw-gears 27 and 28, together with the devices for moving the gear 28 laterally with respect to the gear 27, constitute such a device for varying the length of film fed forward each time the feeding apparatus operates on the film, for when the gear 28 is moved laterally the effect of such movement is to move the roller 24 backward or forward, according to the direction in which the gear 28 is moved with reference to its companion roller 23—that is to say, by moving the gear 28 upon its shaft the roller 24 is given a certain amount of angular advance, varying with the position of the gear 28. The effect of this angular advance is to vary the length of the period in each revolution of the two rollers 23 and 24 during which both are in contact with the film, thus varying the length of film fed forward at each revolution of said roller. I do not claim herein this mechanism for varying the rate of feeding of the film, as it is the joint invention of John A. Pross and myself and is reserved for a separate application for Letters Patent.

Film-cases 14 intended for use in consecutive-view cameras will either be made without the rear opening 41 or if provided with such opening it will be closed in a suitable manner before exposing the charged case to actinic light.

Having thus completely described my invention, what I claim, and desire to secure by Letters Patent, is—

1. In a consecutive-view apparatus, the combination, with a case, removable from the apparatus, containing devices for delivering and taking up a film or picture-strip and for guiding the same through the field of the apparatus, and containing also a strip-feeding device provided with means for engaging a driving device, of continuously-operating driving mechanism external to and independent of said case which engages and drives such strip-feeding device when the case is in place in the apparatus, substantially as described.

2. In a consecutive-view apparatus, the combination, with a case, removable from the apparatus, containing supply and winding-up reels, and guides for guiding a flexible picture-strip or film through the field of the apparatus, and containing also a strip-feeding device provided with means for engaging a driving device, of continuously-operating driving mechanism external to and independent of said case which engages and drives such strip-feeding device when the case is in place in the apparatus, substantially as described.

3. In a consecutive-view apparatus, the combination, with a case, removable from the apparatus, containing supply and winding-up reels, means for carrying a flexible picture-strip or film through the field of the apparatus and containing also a strip-feeding device provided with means for engaging a driving device, of continuously-operating driving mechanism external to and independent of said case which engages and drives such strip-feeding device and the winding-up reel, when the case is in place in the apparatus, substantially as described.

4. In a consecutive-view apparatus, the combination, with driving and feeding mechanism having two shafts, adapted to drive coacting feeding-rollers, of a case, removable from the apparatus, containing devices for delivering and taking up a film or picture-strip and for guiding the same through the field of the apparatus, one of said shafts projecting into said case, and coacting feeding-rollers on said shafts, substantially as described.

5. In a consecutive-view apparatus, the combination, with driving and feeding mechanism, containing two shafts, adapted to drive coacting feeding-rollers, of a case, removable from the apparatus, containing devices for delivering and taking up a film or picture-strip and for guiding the same through the field of the apparatus, one of said shafts projecting into the case, when the same is in place in the apparatus, and coacting feeding-rollers on said shafts, one located within the removable case and the other projecting through an opening in said case, substantially as described.

6. In a consecutive-view apparatus, the combination, with driving and feeding mechanism, containing two shafts, adapted to drive coacting feeding-rollers, of a case, removable from the apparatus, containing devices for delivering and taking up a film or picture-strip and for guiding the same through the field of the apparatus, coacting feeding-rollers, one revolubly mounted in said case and having a central aperture into which one of said shafts may lie when the case is in place in the apparatus, the other of said rollers being mounted upon the other of said shafts and projecting through an opening in the case, substantially as described.

7. In a consecutive-view apparatus, the combination, with driving and feeding mechanism, of a case, removable from the apparatus, containing means for supplying a film or picture-strip, and a revolubly-mounted bushing adapted to drive the winding-up reel, said driving mechanism containing a driving device which engages said bushing when the case is in place in the apparatus, substantially as described.

8. In a consecutive-view apparatus, the combination, with a film-case, removable from the apparatus, containing means for supplying a film or picture-strip and a winding-up reel, of film-feeding rollers, one carried by said case, a driving device adapted to drive the roller carried by the case when the latter is in place in the apparatus, means for driving the other roller, and another driving device adapted to drive the winding-up reel when the case is in place in the apparatus, substantially as described.

9. A film-case for consecutive-view apparatus, consisting of a box or case, adapted to be placed in and removed from such apparatus, provided with means for supplying and taking up a flexible film or picture-strip, and for guiding such film or picture-strip, and with a feeding device which is connected with a continuously-operating driving device when the case is in place in the apparatus, substantially as described.

10. A film-case for consecutive-view apparatus, consisting of a box or case, adapted to be placed in and removed from such apparatus, provided with means for supplying and taking up a flexible picture-strip or film, means for guiding such strip or film, and a feeding-roller, and having an opening opposite said feeding-roller through which a coacting feeding-roller may project, substantially as described.

11. A film-case for consecutive-view apparatus, consisting of a box or case, adapted to be placed in and removed from such apparatus, provided with supply and winding-up reels, means for guiding a film or strip, and a feeding-roller, said feeding-roller and winding-up reel being connected to suitable continuously-operating driving devices when the case is in place in the apparatus, substantially as described.

12. In a consecutive-view apparatus, the combination, with means for feeding the film intermittently, of a trough through which the film passes, approximating in width the width of the film, and forming with said film an air-cushion, whereby undue strain upon the film may be avoided, substantially as described.

13. In a consecutive-view apparatus, the combination, with a supply-reel, feeding mechanism for feeding the film forward from said supply-reel intermittently, and a trough through which the film passes, approximating in width the width of the film and forming therewith an air-cushion, whereby undue strain upon the film may be avoided, substantially as described.

14. In a consecutive-view apparatus, the combination, with a strip-feeding device for feeding a film or strip intermittently through the field of the apparatus, which, when not so feeding the film, leaves the same free to move, a friction device for holding the film stationary in the field of the apparatus when the feeding device is not operating on said film, a winding-up reel, and means for driving the same at a speed corresponding to the rate of delivery of the film thereto, of a plurality of snubbing-posts about which said film may pass, after passing through the field of exposure and before reaching the winding-up reel, whereby transmission of strain produced by the winding-up mechanism to the portion of the film in the field of exposure may be avoided, substantially as described.

15. In a consecutive-view apparatus, the combination, with a strip-feeding device for feeding a film or strip intermittently through the field of the apparatus, which, when not so feeding the film, leaves the same free to move, a friction device for holding the film stationary in the field of the apparatus when the feeding device is not operating on said film, a winding-up reel, and a yielding frictional driving device therefor, of snubbing-posts about which the film may pass, interposed between the exposure-point and the winding-up reel, whereby transmission of strain produced by the winding-up mechanism to the portion of the film in the field of exposure may be avoided, substantially as described.

In testimony whereof I hereunto affix my signature in the presence of two witnesses.

HERMAN CASLER.

Witnesses:
S. M. WING,
J. H. POOL.